US008326785B2

(12) United States Patent
Niu et al.

(10) Patent No.: US 8,326,785 B2
(45) Date of Patent: Dec. 4, 2012

(54) JOINT RANKING MODEL FOR MULTILINGUAL WEB SEARCH

(75) Inventors: Cheng Niu, Redmond, WA (US); Ming Zhou, Beijing (CN); Hsiao-Wuen Hon, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 891 days.

(21) Appl. No.: 12/241,078

(22) Filed: Sep. 30, 2008

(65) Prior Publication Data

US 2010/0082511 A1 Apr. 1, 2010

(51) Int. Cl.
*G06F 17/00* (2006.01)
*G06F 17/20* (2006.01)
*G06F 7/00* (2006.01)
*G06F 17/30* (2006.01)
*G06N 5/00* (2006.01)

(52) U.S. Cl. ............... 706/45; 704/8; 707/723
(58) Field of Classification Search .......... 707/706, 707/707, 723, 728, 760, 999.03, 999.05; 704/8, 277; 706/45
See application file for complete search history.

(56) References Cited

U.S. PATENT DOCUMENTS

| | | | |
|---|---|---|---|
| 5,301,109 A | 4/1994 | Landauer et al. | |
| 5,594,641 A | 1/1997 | Kaplan et al. | |
| 6,006,221 A | 12/1999 | Liddy et al. | |
| 6,349,276 B1 | 2/2002 | McCarley | |
| 6,360,196 B1 | 3/2002 | Poznanski et al. | |
| 7,369,987 B2 | 5/2008 | Loofbourrow et al. | |
| 7,844,590 B1* | 11/2010 | Zwicky et al. ............ | 707/706 |
| 2006/0173839 A1 | 8/2006 | Knepper et al. | |
| 2006/0173886 A1 | 8/2006 | Moulinier et al. | |
| 2006/0265362 A1* | 11/2006 | Bradford ................... | 707/3 |
| 2007/0094006 A1 | 4/2007 | Todhunter et al. | |
| 2007/0136276 A1* | 6/2007 | Vella ......................... | 707/5 |
| 2009/0024613 A1* | 1/2009 | Niu et al. .................. | 707/5 |
| 2009/0222437 A1* | 9/2009 | Niu et al. .................. | 707/5 |
| 2011/0295857 A1* | 12/2011 | Aw et al. ................... | 707/739 |

OTHER PUBLICATIONS

Yan, R. "Probabilistic Models for Combining Diverse Knowledge Sources in Multimedia Retrieval". Thesis, Language Technologies Institute, Carnegie Mellon University. 2006. 239 pages.*
Carbonell, J.G. et al. "Translingual Information Retrieval: A Comparative Evaluation". In Proceedings of the 15th International Joint Conference on Artificial Intelligence. 1997. 7 pages.*
Ko, J. "Probability Approaches for Answer Selection in Multilingual Question Answering". Thesis, Language Technologies Institute, Carnegie Mellon University. Aug. 27, 2007. 170 pages.*

(Continued)

*Primary Examiner* — Jeffrey A Gaffin
*Assistant Examiner* — Benjamin Buss
(74) *Attorney, Agent, or Firm* — Gonzalez Saggio & Harlan LLP

(57) ABSTRACT

A classifier is built to rank documents of different languages found in a query based at least in part on similarity to other documents and the relevance of those other documents to the query. A joint ranking model, e.g., based upon a Boltzmann machine, is used to represent the content similarity among documents, and to help determine joint relevance probability for a set of documents. The relevant documents of one language are thus leveraged to improve the relevance estimation for documents of different languages. In one aspect, a hidden layer of units (neurons) represents clusters (corresponding to relevant topics) among the retrieved documents, with an output layer representing the relevant documents and their features, and edges representing a relationship between clusters and documents.

20 Claims, 4 Drawing Sheets

OTHER PUBLICATIONS

Potthast, M. et al. "A Wikipedia-Based Multilingual Retrieval Model". ECIR 2008. LNCS 4956. pp. 522-530. Mar. 30-Apr. 3, 2008.*
Ogden, W. et al. "Keizai: An Interactive Cross-Language Text Retrieval System". 1999. 6 pages.*
Fujii, A. et al. "Evaluating Multi-lingual Information Retrieval and Clustering at ULIS". 2001.*
Oard, D. W. et al. "A Survey of Multilingual Text Retrieval". UMIACS-TR-96-19 CS-TR-3615. Apr. 1996.*
Hull, D. A. et al. "Querying Across Languages: A Dictionary-Based Approach to Multilingual Information Retrieval". SIGIR'96. ACM. 1996. pp. 49-57.*
Lee, K-S. et al. "Re-ranking model based on document clusters". Elsevier Science. 2000. 14 pages.*
Lavrenko, et al., "Cross Lingual Relevance Models", SIGIR'02, Aug. 11-15, 2002, Tampere, Finland. 8 Pages.
Fujii, et al., "Evaluating Multi-lingual Information Retrieval and Clustering at ULIS", 2001. 5 Pages.
Manmatha, et al., "Modeling Score Distributions for Combining the Outputs of Search Engines", submitted to ACM SIGIR'01 New Orleans, Louisiana, USA. 10 Pages, 2001.
Ackley, et al., "A Learning Algorithm for Boltzmann Machines", Cognitive Science 9, 147-169 (1985).
Ko, et al., "A Probabilistic Graphical Model for Joint Answer Ranking in Question Answering", SIGIR 2007 Proceedings Session 14: Question Answering. SIGIR'07, Jul. 23-27, 2007, Amsterdam, The Netherlands. pp. 343-350.
Si, et al., "A Semisupervised Learning Method to Merge Search Engine Results", ACM Transactions on Information Systems, vol. 21, No. 4, Oct. 2003, pp. 457-491.
Yue, et al., "A Support Vector Method for Optimizing Average Precision", SIGIR'07, Jul. 23-27, 2007, Amsterdam, The Netherlands. Copyright 2007 ACM.
Xu, et al., "AdaRank: A Boosting Algorithm for Information Retrieval", SIGIR 2007 Proceedings Session 16: Learning to Rank II. SIGIR'07, Jul. 23-27, 2007, Amsterdam, The Netherlands. Copyright 2007 ACM. pp. 391-398.
Freund, et al., "An Efficient Boosting Algorithm for Combining Preferences" Journal of Machine Learning Research 4 (2003) 933-969 Submitted Dec. 2001; Revised Nov. 2002; Published Nov. 2003.
Bunescu, et al., "Collective Information Extraction with Relational Markov Networks", Proceedings of the 42nd Annual Meeting on Association for Computational Linguistics. Barcelona, Spain. Article No. 438, 2004.
Shaw, et al., "Combination of Multiple Searches", The Second Text REtrieval Conference (TREC-2). 1994.
Braschler, et al., "Cross-Language Evaluation Forum: Objectives, Results, Achievements", Information Retrieval, 7, 7-31, 2004. pp. 7-31.
Chen, "Cross-Language Retrieval Experiments at CLEF 2002", C.A. Peters (Ed.): CLEF 2002, LNCS 2785, pp. 28-48, 2003.
Calve, et al., "Database Merging Strategy Based on Logistic Regression", Information Processing and Management: an International Journal. vol. 36 , Issue 3 (May 2000) pp. 341-359.
Nallapati, "Discriminative Models for Information Retrieval", SIGIR'04, Jul. 25-29, 2004, Sheffield, South Yorkshire, UK. pp. 64-71.
Tibshirani, et al., "Estimating the Number of Clusters in a Dataset via the Gap Statistic" Mar. 29, 2000. pp. 1-21.
Herbrich, et al., "Large Margin Rank Boundaries for Ordinal Regression", Advances in Large Margin Classifiers , pp. 115-132, 2000.
Burges, et al., "Learning to Rank using Gradient Descent", Proceedings of the 22 nd International Conference on Machine Learning, Bonn, Germany, 2005.
Abusalah, et al., "Literature Review of Cross Language Information Retrieval", Proceedings of World Academy of Science, Engineering and Technology vol. 4 Feb. 2005 ISSN 1307-6884. pp. 175-177.
"Markov Chain Monte Carlo and Gibbs Sampling" Lecture Notes for EEB 581, version 26 Apr. 2004, c B. Walsh 2004. pp. 1-24.
Lin, et al., "Merging Mechanisms in Multilingual Information Retrieval", Lecture notes in computer science, pp. 175-186, 2003.
Mathieu, et al.,"Multilingual document clusters discovery", 2004. 10 Pages.
Si, et al., "CLEF 2005: Multilingual Retrieval by Combining Multiple Multilingual Ranked Lists", CLEF 2005, LNCS 4022, pp. 121-130, 2006.
Robertson, et al., "Okapi at TREC-3", TREC 1994. 19 Pages.
Salakhutdinov, et al., "Restricted Boltzmann Machines for Collaborative Filtering", Proceedings of the 24 th International Conference on Machine Learning, Corvallis, OR, 2007.
Savoy, et al., "Selection and Merging Strategies for Multilingual Information Retrieval", LNCS 3491, pp. 27-37, 2005.
Jaakkola, "Variational Methods for Inference and Estimation in Graphical Models" Copyright MIT, 1997. pp. 1-94.

* cited by examiner

JOINT RANKING MODEL FOR MULTILINGUAL WEB SEARCH

BACKGROUND

With more and more different languages becoming used on the Web, both with respect to Web documents and the Internet users, the task of searching for content across multiple languages has become more and more difficult. Multilingual information retrieval (MLIR) for web pages technology works in this area, but is complex due to many language barriers, and in particular translation problems.

For example, given a query in one language, one multilingual search approach attempts to locate documents in another, target language for a query by using machine translation to translate the query into the target language. Another approach performs a document translation, and essentially works in the opposite direction.

However, not only does such machine translation to find relevant documents, generally because of translation issues, but ranking the retrieved pages of different languages is not very good. In general, it is very difficult to estimate cross-lingual relevancy because of the information loss due to the imperfect translation MLIR ranking is even more difficult because documents in multiple languages have to be compared and merged appropriately. In short, there is lack of suitable ranking algorithms for multilingual web search.

A research field referred to as "learning-to-rank" is directed to learning a unique ranking function for a set of documents; a multilingual version is directed to learning a unique ranking function for documents of different languages. This is done intuitively by representing documents of different languages within a unified feature space, and performing a monolingual ranking task. However, the information loss and misinterpretation due to imperfect queries and document translation makes multilingual search ranking a very difficult problem, and heretofore has not been acceptable in many instances.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which similarity between a first document of first language and a second document of a second, different language are determined, with the similarity used to rank the relevance of the second document with respect to a query submitted in the first language. In one aspect, the similarity is determined by evaluating multilingual features between documents, e.g., keywords versus translated keywords.

In one aspect, a classifier is trained to use the similarity in ranking relevance, essentially by learning a ranking function to estimate comparable scores of documents of different languages. The classifier may be a Boltzmann machine, constructed with each document and each cluster (a topic-based grouping) corresponding to one unit of the Boltzmann machine, with each document unit corresponding to document features, and with edges between each document unit and each cluster unit representing a correlation between that document's relevancy and that cluster's relevancy. Only a subset of available clusters may be chosen for building the Boltzmann machine, e.g., based on relevance.

In one aspect, the Boltzmann machine may be trained by adjusting weights and thresholds such that a predicted document relevancy distribution approximates a target distribution, and/or by optimizing based upon mean average precision.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a joint ranking model that exploits the similarity in content among a set of documents of different languages, and determines a joint relevance probability for the documents. As will be understood, the relevant documents of one language are leveraged to improve the relevance estimation for documents of different languages. By way of example, if English language document E is very relevant to an English language query $Q_E$, and is known from previous offline analysis to be very similar to a Chinese document C, then document C is also likely very relevant to the query $Q_E$. The offline analysis may, for example, match features such as translated keywords to determine similarity. A search for multilingual (English and Chinese) documents with query $Q_E$ ranks the Chinese document C generally higher based upon document E's relevance score and document E's similarity to document C. Features may be matched in one or both translation directions, e.g., the English document's keywords may be translated to Chinese and compared against the Chinese document's keywords, and/or the Chinese document's keywords may be translated to English and compared against the English document's keywords, and so forth with other features.

While some of the examples described herein are directed towards an example classifier and example features, it is understood that these are only examples. Other classifiers may be used to leverage the similarities in documents of different languages, and other features may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, searching, ranking and/or document processing in general.

In traditional technology, ranking for multilingual information retrieval (MLIR) ranks documents of different languages solely based on their relevancy to the query, regardless of the original language of the query. Existing research for MLIR ranking is focused on combining relevance scores of different retrieval settings. Although some MLIR ranking schemes involve machine learning, they are still focused on combining relevance scores associated with multiple retrieval settings, but ignore the direct modeling of each feature's contribution to MLIR relevancy. As a result, the resulting ranking algorithms often do not work well for web MLIR, which involves a large number of ranking features.

Figure 1:
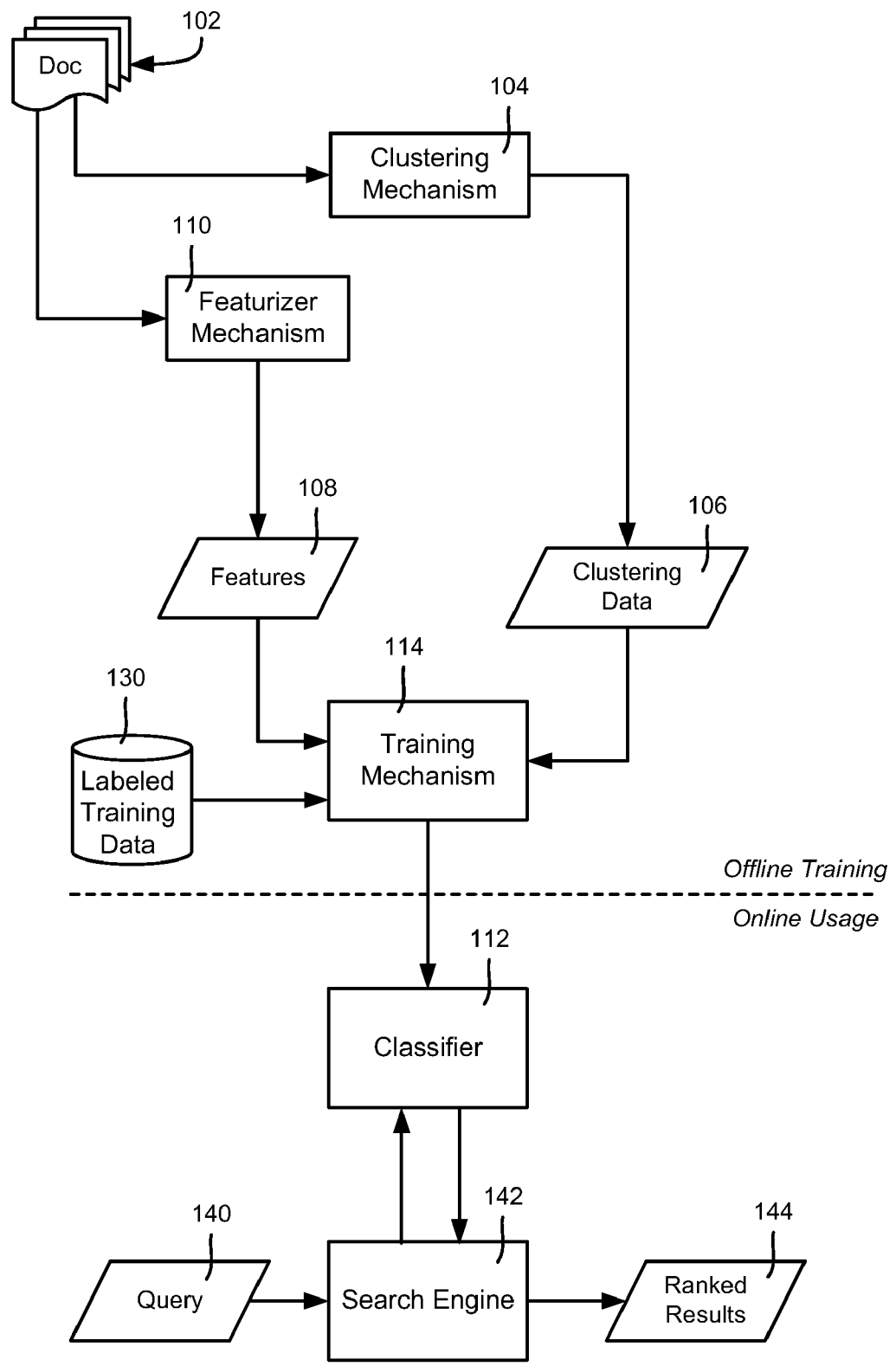
FIG. 1 is a block diagram showing example components for training and using a classifier for ranking multilingual documents.

In contrast, described herein is Web MLIR ranking within a learning-to-rank framework, in which instead of estimating the relevancy of each individual document to the query, a mechanism/process exploits the monolingual and cross-lingual content similarity among documents, and induces a joint relevance probability of all the documents. To this end, as generally represented in FIG. 1, given a set of candidate documents 102, multilingual document clustering is performed to identify relevant topics among the documents, as generally represented by the clustering mechanism 104 and the clustering data 106. In addition, multilingual features 108, such as keywords, are extracted from the documents by a featurizer mechanism 110.

Then, a classifier 112 (e.g., a Boltzmann machine, trained by a training mechanism 114 described below) is used to estimate a joint relevance probability based on the documents' individual features 108 and the correlation between document relevance and topic relevance (as maintained in the clustering data 106). Because similar documents usually cover the same topic and share similar relevance ranks, the document relevancy and topic relevancy can be decided collaboratively for improved information retrieval accuracy.

Thus, in addition to the traditional query and document similarity technology, or in place of traditional technology, the technology described herein leverages the similarities among candidate documents 102 to further enhance their relevance ranking. Based on the observation that similar documents usually share similar relevancy ranks, monolingual relevant documents are leveraged to enhance the relevancy estimation for documents of different languages, thereby helping to overcome the inaccuracies caused by translation errors.

Figure 2:
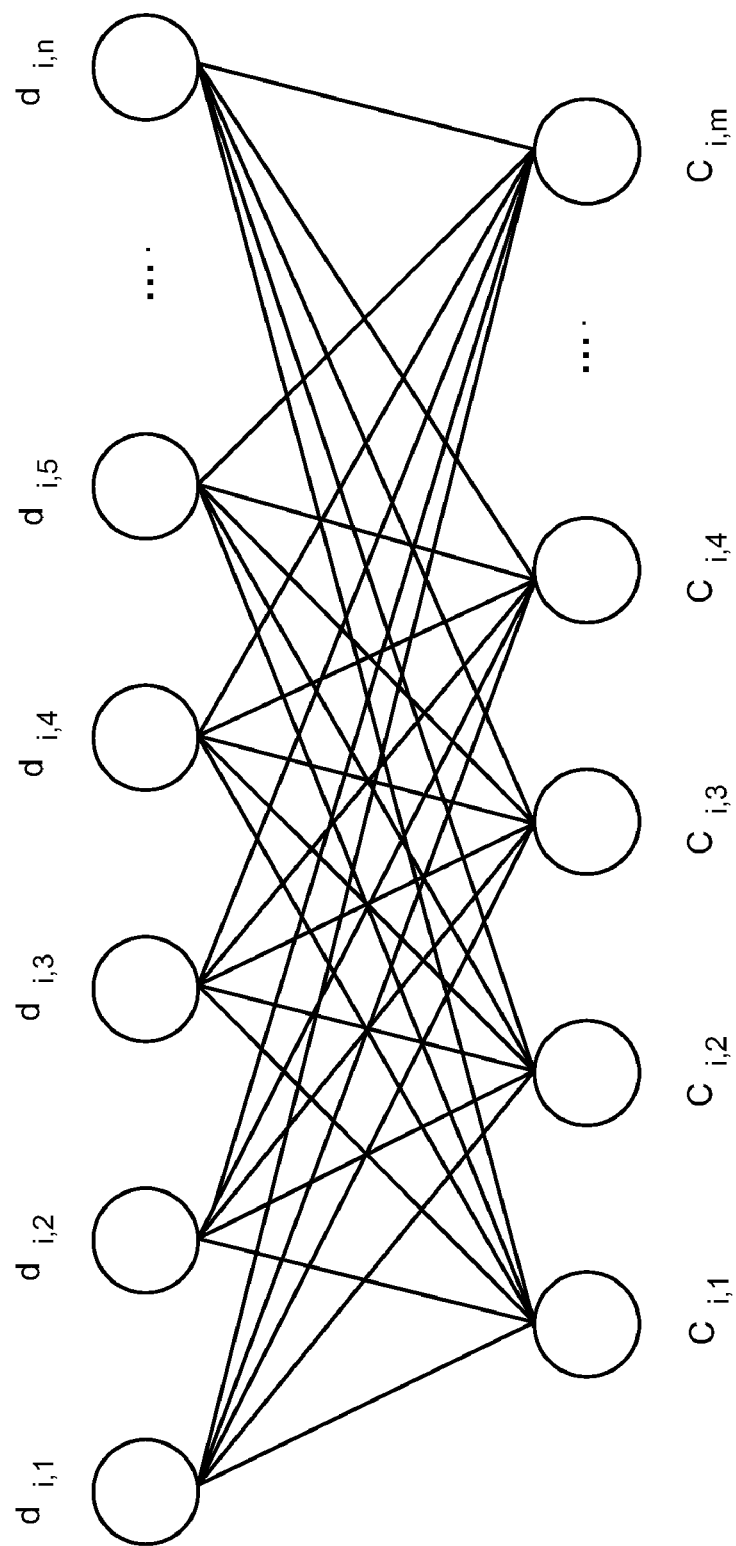
FIG. 2 is a representation of a Boltzmann machine used as a classifier for ranking multilingual documents.

As generally represented in FIG. 2, in one implementation, a Boltzmann machine/stochastic recurrent neural network 220 is used for the joint relevance estimation (generally due to its successful modeling of correlations among individual decisions to enhance question answering and information extraction). More particularly, a hidden layer of neurons is introduced to represent relevant topics among retrieved documents, with the relevant documents and relevant topics are identified collaboratively. The parameters of the Boltzmann machine may be trained under different configurations, to optimize the accuracy of identifying relevant documents, and/or to directly optimize information retrieval evaluation measures, such as mean average precision (MAP).

In a general framework of learning-to-rank for MLIR, a ranking function is learned to estimate comparable scores to documents of different languages. In a training stage, a set of queries $Q=\{q_i\}$ are given; each query $q_i$ is associated with a list of retrieved documents $d_i=\{d_{i,j}\}$ together with a list of relevance labels $l_i=\{l_{i,j}\}$, where $l_{i,j}$ is the label associated with $d_{i,j}$, and may take one of the ordinal values in $R=\{r_1,r_2,\ldots,r_k\}$, $r_1>r_2>\ldots>r_k$. Here > denotes the order relation. Thus, the training data set 130 (FIG. 1) can be represented as $T=\{q_i,d_i,l_i\}$.

To facilitate the learning of the ranking function, a unified feature space $\aleph=\{f_k(q_i,d_{i,j})\}$ is designed, where $f_k(q_i,d_{i,j})$ is a feature function for each query-document pair. The objective of the training is to learn a ranking function $F_R: \aleph \to R$ that assigns a relevance score for each retrieved document. Then the retrieved documents are ranked by their scores. Specifically, a permutation of integers $\pi(q_i,d_i,F_R)$ is introduced to denote the ranked orders among documents $d_i$ for query $q_i$ using ranking function $F_R$, and $\pi(q_i,d_{i,j},F_R)$ refers to the position of $d_{i,j}$ in the ranked list. Then the training process is to search for $F_R$ which minimizes a loss function representing the disagreement between $\pi(q_i,d_i,F_R)$ and the ranked list given by $l_i$ for all the queries.

The ranking function takes different forms when using different learning algorithms. For example, in RankSVM, the ranking function is expressed as:

$$F_R(\{f_k(q_i,d_{i,j})\})=w\cdot\phi(\{f_k(q_i,d_{i,j})\}) \qquad (1)$$

where $\phi$ is the mapping from the input feature space onto the kernel space, and w is the weight vector in the kernel space which will be learned during the training.

In contrast, RankNet uses ranking function of the following form:

$$F_R(\{f_k(q_i,d_{i,j})\}) = \frac{1}{\exp\left(-\sum_k w_k f_k(q_i,d_{i,j})\right)+1} \qquad (2)$$

The above applies to learning-to-rank in general. To apply learning-to-rank for MLIR, a unified feature space is assigned for documents across different languages. Typical query-document features are exemplified in Table 1, (with further description about constructing the multilingual feature space provided below):

TABLE 1 examples of query-document features

| Feature Name | Description |
| --- | --- |
| BM25_Field | BM25 relevance scores between the query and the document using different fields of the document, such as title, body, etc. |
| BM25_Norm_Field | BM25_Field divided by the sum of IDFs of query words |
| Words_Found_Field | The % query words found in different fields of the document |
| Perfect_Match_Field | # of phrases found in different fields exactly matching with the query |
| TFIDF_n_Field | tf*idf of the first n query terms occurring in different fields where n is pre-defined |
| LM_Field | Relevance Score returned by the language-modeling-based retrieval model using different fields of the document |

Edges between instance pairs may be created to represent the dependency among individual instances. However, this results in a quadratic expansion of the edge number in the Boltzmann machine, and is thus unacceptable in the Web search scenario with hundreds of candidate documents involved. As a result, multilingual clustering is first performed to uncover relevant topics, with the direct document link being replaced by the edges between a document and the topics, as generally represented in FIG. 2. Moreover, only the largest clusters are introduced into the Boltzmann machine, whereby the size of the Boltzmann machine is linear in term of the input document number.

Given a query $q_i$ and its retrieved documents $d_i=\{d_{i,j}\}$, multilingual clustering is first performed, and the resulting clusters are represented as $c_i=\{c_{i,j}\}$. More particularly, with multilingual clustering, the retrieved documents are clustered to uncover the relevant topics and create hidden units in Boltzmann machine. Because the documents to be clustered are in different languages, some machine translation mechanisms are employed for document comparison. In one implementation, a known cross-lingual document similarity measure is used for its simple implementation and high efficiency. The measure is a cosine-like function with an extension of TF-IDF (term frequency-inverse document frequency) weights for the cross-lingual case, using a dictionary for keyword translation. The cross-lingual document similarity measure is formalized as follows:

$$sim(d_1, d_2) = \frac{\sum_{(t_1,t_2)\in T(d_1,d_2)} tf(t_1,d_1)idf(t_1,t_2)tf(t_2,d_2)idf(t_1,t_2)}{N^{1/2}} \quad (5)$$

where N is given as $$N = \sum_{(t_1,t_2)\in T(d_1,d_2)} (tf(t_1,d_1)idf(t_1,t_2))^2 + \quad (6)$$

$$\sum_{(t_1,t_2)\notin T(d_1,d_2)} (tf(t_1,d_1)idf(t_1))^2 +$$

$$\sum_{(t_1,t_2)\in T(d_1,d_2)} (tf(t_2,d_2)idf(t_1,t_2))^2 +$$

$$\Sigma_{(t_1,t_2)\notin T(d_1,d_2)}(tf(t_2,d_2)idf(t_2))^2.$$

$T(d_1,d_2)$ denotes the sets of word pairs where $t_2$ is the translation of $t_1$, and $t_1$ occurs in document $d_1$, and $t_2$ occurs in document; $d_2 \cdot idf(t_1,t_2)$ is the extension of IDF for a translation pair $(t_1,t_2)$ is defined as:

$$idf(t_1,t_2) = \log\left(\frac{n}{df(t1)+df(t2)}\right) \quad (7)$$

where n denotes the total number of documents in two languages. In practice, the similarity of documents of different languages are measured with this function above, and for those of the same language, their similarity is calculated by the classical cosine function.

Using the above document similarity measures, a k-means algorithm is used for document clustering, which requires time complexity $O(|C||D|)$ where $|C|$ is the cluster number and $|D|$ is the document number. The cluster number may be dynamically determined, e.g., with only the four largest clusters introduced into Boltzmann machine (based on the observation that minor clusters usually irrelevant to the query).

In addition to being used for multilingual clustering, Equation (6) is used to compute the Boltzmann machine edge features that represent document-cluster correlations, which are shown in Table 2:

TABLE 2 edge features of Boltzmann Machine:

| Feature Name | Description |
| --- | --- |
| Sim_ML_Field | Averaged monolingual similarity between the document and the documents in the same language in a cluster using different document fields |
| Sim_CL_field | Averaged cross-lingual similarity (Equation 5) between the document and the documents in different languages in a cluster using different fields |
| Sim_Field | Averaged similarity between document and the documents in a cluster independent of languages |

With these features, the Boltzmann machine of FIG. 2 is constructed. Both a document and a cluster correspond to one (neuron) unit of the Boltzmann machine, and the state of the unit takes one of ordinary values $R=\{r_1,r_2,\ldots,r_k\}$ representing the relevance of the unit. The cluster units are regarded as the hidden units because their relevance labels are not provided by the training data. The document units are the output units because their relevance labels are the final output for ranking. Although a document belongs to at most one cluster, edges exist between a document unit and every cluster unit, representing the correlation between the document's relevancy and every cluster's relevancy.

Using $sd=\{sd_{i,j}\}$ and $sc=\{sc_{i,j'}\}$ to represent the states of the document and cluster units, the energy of the Boltzmann machine is defined as:

$$E(sd, sc, q_i) = -\frac{1}{2}\sum_{l,j,j'} w_k g_l(d_{i,j}, c_{i,j'}) sd_{i,j} sc_{i,j'} - \sum_{i,k} s_{i,j}\theta_k f_k(q_i, d_{i,j}) \quad (3)$$

where $f_k(q_i,d_{i,j})$ is one of the query-document features exemplified in Table 1, $g_l(d_{i,j},c_{i,j'})$ is a document-cluster feature shown in Table 2 (the edge feature estimation involves the cross-lingual document similarity described herein section), and $\theta_k$ and $w_l$ are the corresponding weights. The probability of the global state configuration follows Boltzmann distribution which takes the following form:

$$p(sd, sc, q_i) = \frac{1}{z}\exp(-E(sd, sc, q_i)) \quad (4)$$

where $Z=\Sigma_{\{sd\}\{sc\}}\exp(-E(sd, sc, q_i))$ is the normalization constant.

To summarize the Boltzmann Machine for MLIR Ranking of FIG. 2, the first layer contains output units corresponding to documents, and the second layer contains hidden units corresponding to clusters. Edges exist between every document and cluster units, corresponding to the dependency between document relevancy and cluster (topic) relevancy. Each document unit s associated with features $f_k(q_i,d_{i,j})$ exemplified in Table 1, and each edge is associated with features $g_l(d_{i,j},c_{i,j'})$ shown in Table 2.

To use the trained Boltzmann Machine as a classifier, given the training data $T=\{q_i, d_i, l_i\}$, the training of Boltzmann machine adjusts the weights and thresholds in Equation (3) in such a way that the predicted document relevancy distribution {p(sd,q_i)=Σ_{sc}p(sd, sc, q_i)} approximates the target distribution {p*(sd,q_i)} as closely as possible, where $$p*(sd \mid q_i) = \begin{cases} 1, & \text{if } sd = l_i; \\ 0, & \text{otherwise.} \end{cases} \quad K - L$$

divergence is used to measure the probability distribution difference:

$$K \equiv K(p^* \| p) = \Sigma_{q_i,sd} p^*(sd \mid q_i) \log \frac{p^*(sd \mid q_i)}{p(sd \mid q_i)} \quad (8)$$

To minimize K using gradient descent, the following weight updating rules are obtained:

$$\Delta w_1 = \epsilon \Sigma_{i,j,j'} g_j(sd_{i,j}, sc_{i,j'})(\langle sd_{i,j} sc_{i,j} \rangle_{clampped} - \langle sd_{i,j} sc_{i,j} \rangle_{free}) \quad (9)$$

$$\Delta \theta_k = \epsilon \Sigma_{i,j} f_k(sd_{i,j})(\langle sd_{i,j} \rangle_{clampped} - \langle sd_{i,j} \rangle_{free}) \quad (10)$$

where ε is a parameter called learning rate, and $\langle \cdot \rangle_{clampped}$ and $\langle \cdot \rangle_{free}$ denote the expectation values obtained from the "clamped" and "free-running" stages of the training, respectively. In the clamped stage, the state values of the output units (that is, the document relevance label) are to be equal to the labels in the training data; in the free-running stage, all the possible state configurations are considered for the expectation estimation.

The training procedures start with a set of initial weight values which may be generated randomly. The weights are updated iteratively based on Equation (9) and (10) until the model converges to a local minimum of K. Usually, such a training procedure is repeated several times with different initial weights to attempt more optimal performance.

It is noted that the exact estimation of the expectation value $\langle \cdot \rangle_{clampped}$ and $\langle \cdot \rangle_{free}$ is time consuming because it requires enumerating all the possible state configurations, which is exponential with the number of units. Considering that a query may result in hundreds of retrieved documents, such computation is intractable. As a result, Gibbs sampling is used to approximately estimate the expectation values involved in Equation (9) and (10).

After the Boltzmann machine training, given a new query $q_i$ and the corresponding retrieved documents $d_i$, the relevance probability distribution of a retrieved document may be estimated as follows:

$$p(sd_{i,j}, q_i) = \Sigma_{sd \setminus sd_{i,j}, sc} p(sd, sc, q_i) \quad (11)$$

then $l'_{i,j} = \text{argmax}_{sd_{i,j}} p(sd_{i,j}, q_i)$ is the relevance label predicted by the Boltzmann machine, and is used for the search results ranking. In addition, the value of $p(l'_{i,j}, q_i)$ is used to break any tie during the ranking.

FIG. 1 shows the classifier 112 being used with online multilingual searches in block diagram form. As a query 140 arrives at a search engine 142, the search engine provides its results to the classifier 112. The classifier ranks the results according to its training, and the search engine 142 outputs ranked results 144. The ranking of the classifier may be combined with other ranking mechanisms.

The exact estimation of $p(sd_{i,j}, q_i)$ requires exponential time complexity because a complete global state enumeration is needed. To improve the computation efficiency, one implementation uses mean-field approximation, e.g., for Boltzmann machine inference, including its foundation based on Variational Principle.

In mean field approximation, the state distribution of each unit only relies on the states of its neighboring units, which are all fixed to average state values. So based on the Boltzmann machine in FIG. 2, there is:

$$p(sd_{i,j} = r) = \frac{\exp\left(\sum_{k',j'} w_{k'} g_{k'}(sd_{i,j}, sc_{i,j'})\langle sc_{i,j'} \rangle r + \sum_k \theta_k f(q_i, sd_{i,j})r\right)}{\sum_r \left[\exp\left(\sum_{k',j'} w_{k'} g_{k'}(sd_{i,j}, sc_{i,j'})\langle sc_{i,j'} \rangle r + \sum_k \theta_k f(q_i, sd_{i,j})r\right)\right]} \quad (12)$$

$$p(sc_{i,j'} = r) = \frac{\exp\left(\sum_{k',j} w_{k'} g_{k'}(sd_{i,j}, sc_{i,j'})r\langle sd_{i,j} \rangle\right)}{\sum_r \left[\exp\left(\sum_{k',j} w_{k'} g_{k'}(sd_{i,j}, sc_{i,j'})r\langle sd_{i,j} \rangle\right)\right]} \quad (13)$$

$$\langle sd_{i,j} \rangle = \sum_r p(sd_{i,j} = r)r \quad (14)$$

$$\langle sc_{i,j'} \rangle = \sum_r p(sc_{i,j'} = r)r \quad (15)$$

Here Equation (12) compute the relevance probability distribution of a document given the average relevance labels of the clusters. Similarly, Equation (13) computes the relevance probability distribution of a cluster given the average relevance labels of the documents. Equation (14) and (15) estimate the average relevance labels given the probability distributions computed by Equation (12) and (13).

Equations (12)-(15) are referred to as mean-field equations, and are solved using the following iterative procedure for a fix-point solution:

(i) Assume an average state value for every unit;
(ii) For each unit, estimate its state value probability distribution using Equation (12) and (13) given the average state values of its neighbors;
(iii) Update the average state values for every unit using Equation (14) and (15);
(iv) Go to Step (ii) until the average state values converge.

With respect to Boltzmann Machine Training by mean average precision optimization, as described above, a Boltzmann machine is trained to optimize the relevance label predictions. However, relevance label prediction is just loosely related to MLIR accuracy because the exact relevance labels are not necessary to derive the correct ranking orders. One ranking model trained by direct optimizing information retrieval evaluation measures reports the highest information retrieval ranking accuracy. In one implementation, the Boltzmann machine may be trained in a similar way, that is, by optimizing the mean average precision of MLIR.

Given a query $q_i$, the retrieved documents $d_i$, the exact relevance labels $l_i$, and a ranking function $F_R$, the predicted ranking order is $\pi(q_i, d_i, F_R)$. Then average precision for $q_i$ is defined as:

$$AvgP_i = \frac{\sum_{j=1}^{n(q_i)} P_i(j) \cdot y_{i,j}}{\sum_{j=1}^{n(q_i)} y_{i,j}} \quad (16)$$

where $y_{i,j}$ is assigned with 1 or 0 depending on $d_{i,j'}(\pi(q_i, d_{i,j}, F_R)=j)$ is relevant or not, and $P_i(j)$ is defined as the precision at the rank position of j:

$$P_i(j) = \frac{\sum_{j'<j} y_{i,j'}}{j} \quad (17)$$

Mean average precision is an average of $\text{AvgP}_i$ over all the queries.

Instead of simply maximizing mean average precision, the following objective function is selected to maximize:

$$\text{MAP} - C\Sigma_l|w_l|^2 - C\Sigma_{k'}|\theta_{k'}|^2 \quad (18)$$

Here $\Sigma_{El}|w_l|^2 + \Sigma_{k'}|\theta_{k'}|^2$ is a L-2 regularization term representing the complexity of the model. So Equation (18) is a trade-off between the accuracy of the model and the model's complexity. Similar with SVM learning algorithm, a parameter C is introduced to control the trade-off.

Because the mean average precision is not a continuous function with the weights of the Boltzmann machine, Powell's Direction Set Method, which does not involve derivation computations, is used for the optimization. To achieve more optimal performance, Powell's Direction Set Method is repeatedly called many times with different initial values of the machine's weights. One particular set of the initial values is the weights learned when Boltzmann machine is trained by optimizing classification accuracy as described herein.

Note that the optimization procedure iteratively computes the mean average precision given many different weight values of the Boltzmann machine. The mean-field approximation described herein is used for the involved model inference.

Figure 3:
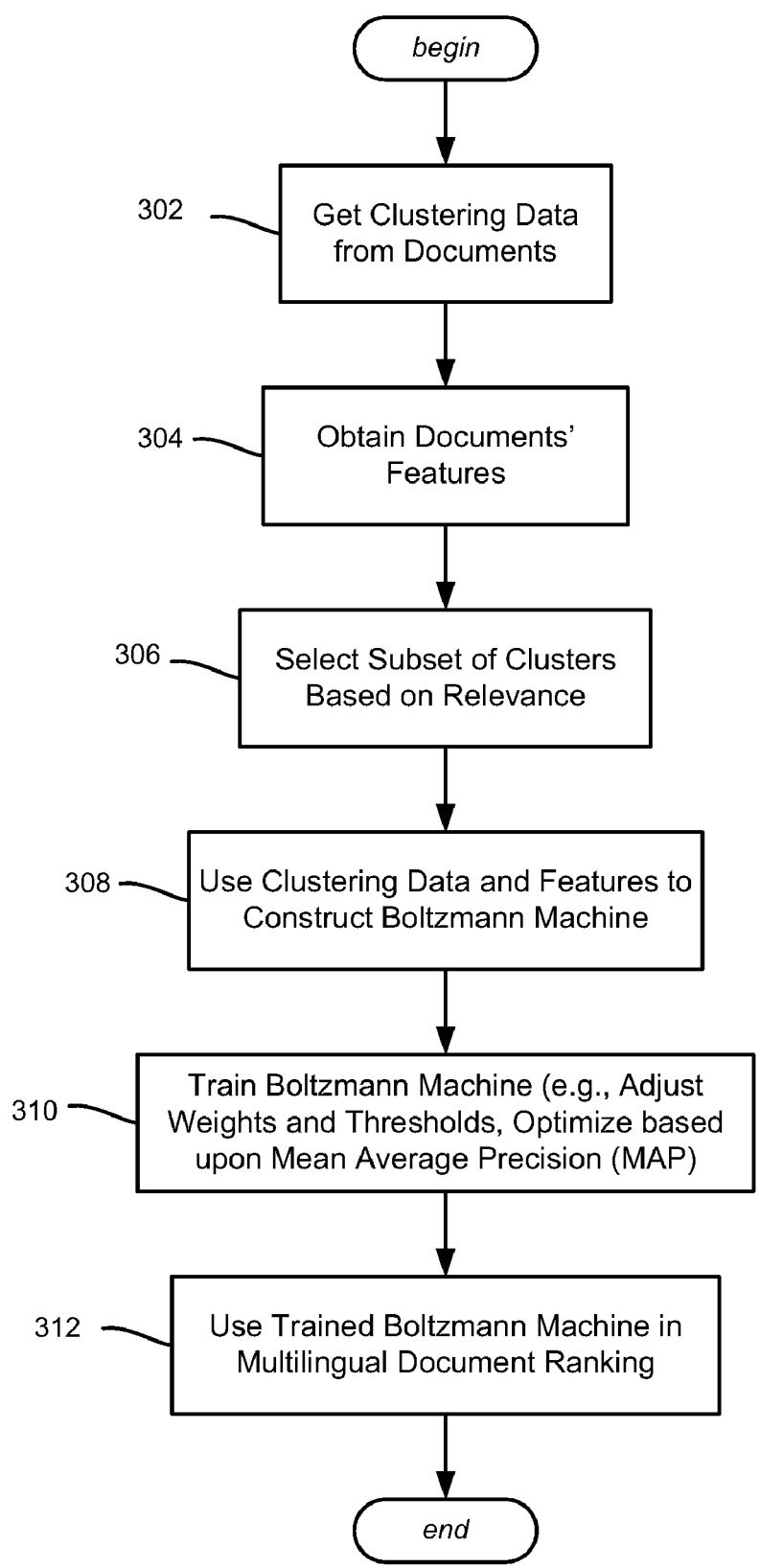
FIG. 3 is a flow diagram representing example steps for implementing a classifier for ranking multilingual documents.

FIG. 3 summarizes the various operations, including clustering the documents based on topic (step 302) and featurizing the documents based upon the multilingual feature space (step 304), this includes any appropriate machine translation. Step 306 selects only a subset of the clusters, as described above, e.g., the most relevant four.

Step 308 represents building the Boltzmann machine, with documents each represented as a document (output) unit having associated document features, and each cluster represented as a cluster (hidden) unit, related to the document units by edge features. At step 310 the Boltzmann machine is trained (e.g., adjusted and/or optimized) as described above. Step 312 represents the use of the Boltzmann machine in ranking documents of different languages.

Exemplary Operating Environment

Figure 4:
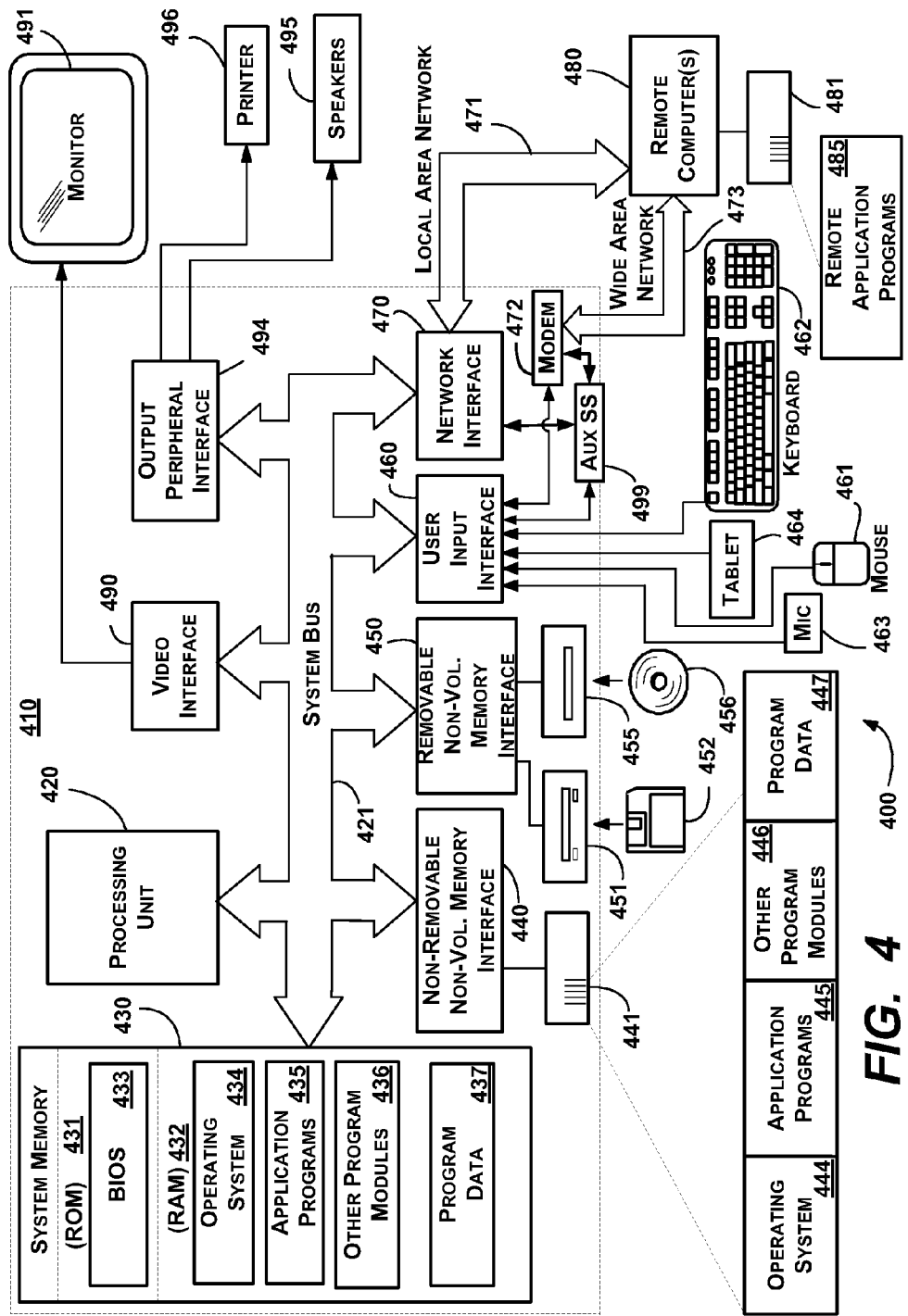
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during startup, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   determining similarity between a first document of a first language and a second document of a second, different language;
   ranking, by a Boltzmann machine, relevance of the second document with respect to a query submitted in the first language using the similarity determined; and
   displaying a result set according to the relevance in response to the query submitted in the first language, wherein the result set includes at least the second document of the second, different language.

2. The method of claim 1 wherein determining the similarity comprises clustering documents of the first language and the second language based upon the query and the query's retrieved documents.

3. The method of claim 1 wherein determining the similarity comprises evaluating multilingual features between documents.

4. The method of claim 3 wherein evaluating the multilingual features comprises comparing at least one of keywords of each document or translated keywords of each document.

5. The method of claim 1 further comprising, training the Boltzmann machine to use the similarity in ranking the relevance.

6. The method of claim 5 wherein training the Boltzmann machine comprises learning a ranking function to estimate comparable scores of documents of different languages.

7. The method of claim 5 wherein training the Boltzmann machine comprises selecting clusters for the machine, and building the Boltzmann machine with each document and each cluster corresponding to one unit of the Boltzmann machine, with each document unit corresponding to document features, and with edges between each document unit and each cluster unit representing a correlation between that document's relevancy and that cluster's relevancy.

8. The method of claim 7 wherein training the Boltzmann machine further comprises adjusting weights and thresholds such that a predicted document relevancy distribution approximates a target distribution.

9. The method of claim 7 wherein training the Boltzmann machine further comprises optimizing based upon mean average precision.

10. In a computing environment, a system comprising:
    a Boltzmann machine configured to rank multilingual documents relative to one another, including relating features of documents to topic-based clusters of documents, the Boltzmann machine further configured to rank documents of different languages relative to a query based upon similarity data between documents according to features of those documents; and
    a display configured to display a set of documents in response to the query, wherein the display of the set of documents is ordered at least in part based on results from the Boltzmann machine.

11. The system of claim 10 wherein the features of the documents are based upon relevance scores between the query and the document using different fields of the document, inverse document frequencies of query words, query words found in different fields of the document, phrases found in different fields matching with the query, or term frequency of query terms occurring in different fields, or any combination of relevance scores between the query and the document using different fields of the document, inverse document frequencies of query words, query words found in different fields of the document, phrases found in different fields matching with the query, or term frequency of query terms occurring in different fields.

12. The system of claim 10 wherein the Boltzmann machine further comprises a first layer containing output units corresponding to document units, and a second layer containing hidden units corresponding to cluster units, in which each document unit is associated with features, and in which edges between the document units and the cluster units correspond to a dependency between document relevancy and cluster relevancy.

13. The system of claim 12 wherein the edges between the document units and a cluster unit comprise edge features, including monolingual similarity between the document and documents in the same language in that cluster using different document fields, cross-lingual similarity between the document and documents in different languages in that cluster using different fields, or similarity between the document and documents in that cluster independent of languages, or any combination of monolingual similarity between the document and the documents in the same language in that cluster using different document fields, cross-lingual similarity between the document and the documents in different languages in that cluster using different fields, or similarity between the document and the documents in that cluster independent of languages.

14. The system of claim 12 further comprising means for training the Boltzmann machine, including means for adjusting weights and thresholds such that a predicted document relevancy distribution approximates a target distribution.

15. The system of claim 12 further comprising means for training the Boltzmann machine, including means for optimizing based upon mean average precision.

16. One or more computer storage media having computer-executable instructions stored thereon, which in response to execution by a computer, cause the computer to perform steps comprising:
    featurizing a set of documents of different languages into multilingual features;
    clustering the set of documents into topic-based clustering data using the multilingual features;
    constructing a Boltzmann machine based on the documents, the multilingual features of the documents, and the topic-based clustering data;
    using the Boltzmann machine to rank the set of documents of different languages returned in a search; and
    displaying at least a portion of the set of documents, wherein an order to display the portion of the set of documents is based at least in part on the rank generated by the Boltzmann machine.

17. The one or more computer storage media of claim 16 having further computer-executable instructions stored thereon, which in response to execution by the computer, cause the computer to perform further steps comprising, selecting only a subset of the clustering data for use in the Boltzmann machine based upon cluster relevance.

18. The one or more computer storage media of claim 16 wherein constructing the Boltzmann machine comprises having each document represented as a document unit corresponding to that document's features, having each cluster represented as a cluster unit, and having edges between each document unit and each cluster unit represent a correlation between that document's relevancy and that cluster's relevancy.

19. The one or more computer storage media of claim 16 having further computer-executable instructions stored thereon, which in response to execution by the computer, cause the computer to perform further steps comprising, training the Boltzmann machine, including adjusting weights and thresholds such that a predicted document relevancy distribution approximates a target distribution.

20. The one or more computer storage media of claim 16 having further computer-executable instructions stored thereon, which in response to execution by the computer, cause the computer to further perform steps comprising, training the Boltzmann machine, including optimizing based upon mean average precision.

* * * * *